United States Patent [19]

Alley et al.

[11] Patent Number: 4,561,314

[45] Date of Patent: Dec. 31, 1985

[54] MAGNETOELASTIC FORCE/PRESSURE SENSOR

[75] Inventors: Robert P. Alley, Clifton Park; John D. Harnden, Jr., Schenectady; William P. Kornrumpf, Albany, all of N.Y.

[73] Assignee: General Electric Company, Schenectady, N.Y.

[21] Appl. No.: 546,227

[22] Filed: Oct. 27, 1983

[51] Int. Cl.[4] .............................................. G01L 1/12
[52] U.S. Cl. ............................. 73/862.69; 73/DIG. 2
[58] Field of Search ........... 73/862.48, 862.64, 862.69, 73/862.04, 862.05, 862.06, DIG. 2, 779

[56] References Cited

U.S. PATENT DOCUMENTS

| | | | |
|---|---|---|---|
| 3,258,962 | 7/1966 | Dahle | 73/862.69 |
| 3,299,382 | 1/1967 | Tanaka et al. | 73/DIG. 2 |
| 4,434,671 | 3/1984 | Yamashita et al. | 73/862.48 |

FOREIGN PATENT DOCUMENTS

| | | | |
|---|---|---|---|
| 0393962 | 9/1973 | U.S.S.R. | 73/862.64 |
| 0484420 | 9/1975 | U.S.S.R. | 73/862.69 |
| 0510656 | 4/1976 | U.S.S.R. | 73/862.69 |
| 0527611 | 9/1976 | U.S.S.R. | 73/862.69 |
| 0907405 | 2/1982 | U.S.S.R. | 73/862.69 |

OTHER PUBLICATIONS

"New Force Transducers Using Amorphous Ribbon Cores", Mohri et al., *IEEE Transactions on Magnetics*, vol. MAG-14, No. 5, Sep. 1978, pp. 1071-1075.
"Sensitive Force Transducers Using A Single Amorphous Core Multivibrator Bridge", Mohri et al., *IEEE Transactions on Magnetics*, vol. MAG-15, No. 6, Nov. 1979, pp. 1806-1808.
"New Extensometers Using Amorphous Magnetostrictive Ribbon Wound Cores", Mohri et al., *IEEE Transactions on Magnetics*, vol. 9-17, No. 3, May 1981, pp. 1317-1319.
"Sensitive Magnetic Sensors Using Amorphous Weigand-Type Ribbons", Mohri et al., *IEEE Transactions on Magnetics*, vol. MAG-17, No. 6, Nov. 1981, pp. 3370-3372.
"Stress-Magnetic Effects In Iron-Rich Amorphous Alloys And Shock-Stress Sensors With No Power", Mohri et al., *IEEE Transactions on Magnetics*, vol. MAG-17, No. 6, Nov. 1981, pp. 3379-3381.
"Metallic Glasses In Sensors And Transducers", Lewis Holmes, *Electronics & Power*, Feb. 1982, pp. 180-182.
"Amorphous Bistable Magnetic Sensors Due To Matteucci Effect", Mohri et al., *Proceedings of the 2nd Sensor Symposium*, 1982, pp. 219-222.
"Sensitive Bistable Magnetic Sensors Using Twisted Amorphous Magnetostrictive Ribbons Due To Matteucci Effect", Mohri et al., *Journal of Applied Physics*, vol. 53, No. 11, Nov. 1982, pp. 8386-8388.

*Primary Examiner*—Charles Hart
*Attorney, Agent, or Firm*—Geoffrey H. Krauss; James C. Davis, Jr.; Marvin Snyder

[57] ABSTRACT

A force/flash pressure sensor utilizes a stack of annular rings of a magnetoelastic material. One major stack surface is supported at a plurality of points having substantially equal angular displacement therebetween. A member, moving along the axis of the ring stack responsive to an axial force, or pressure, to be measured, presses a different set of points against the opposite stack surface, to distort the ring stack and alter the magnetic flux density saturation magnitude thereof. The plurality of points in abutment with each of the opposite major stack surfaces is advantageously equal; a number of different configurations for applying force (pressure) along the axis of the ring stack are described.

25 Claims, 6 Drawing Figures

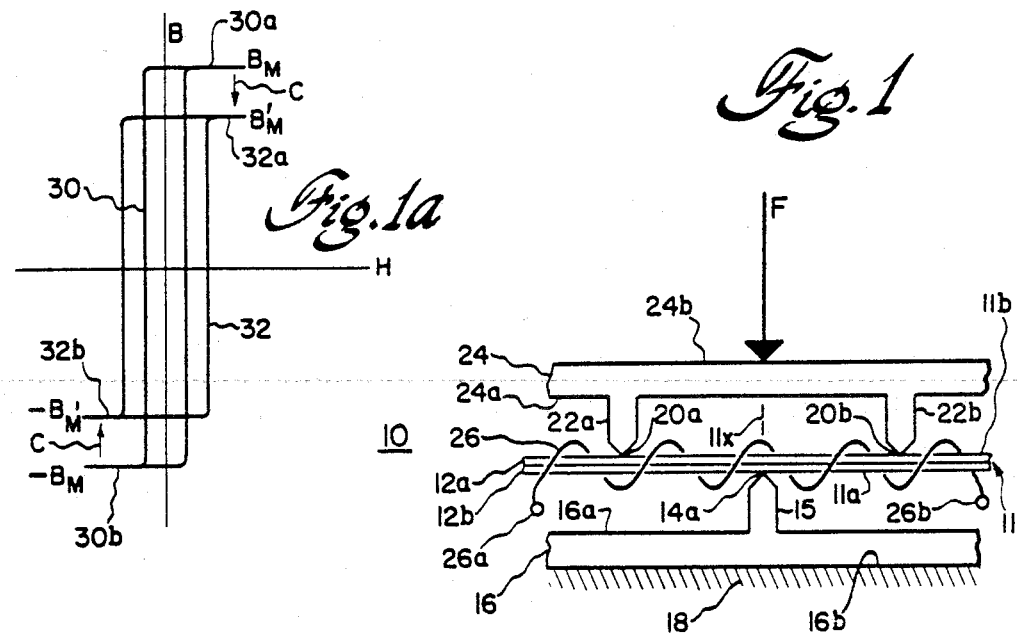
Fig. 1a
Fig. 1
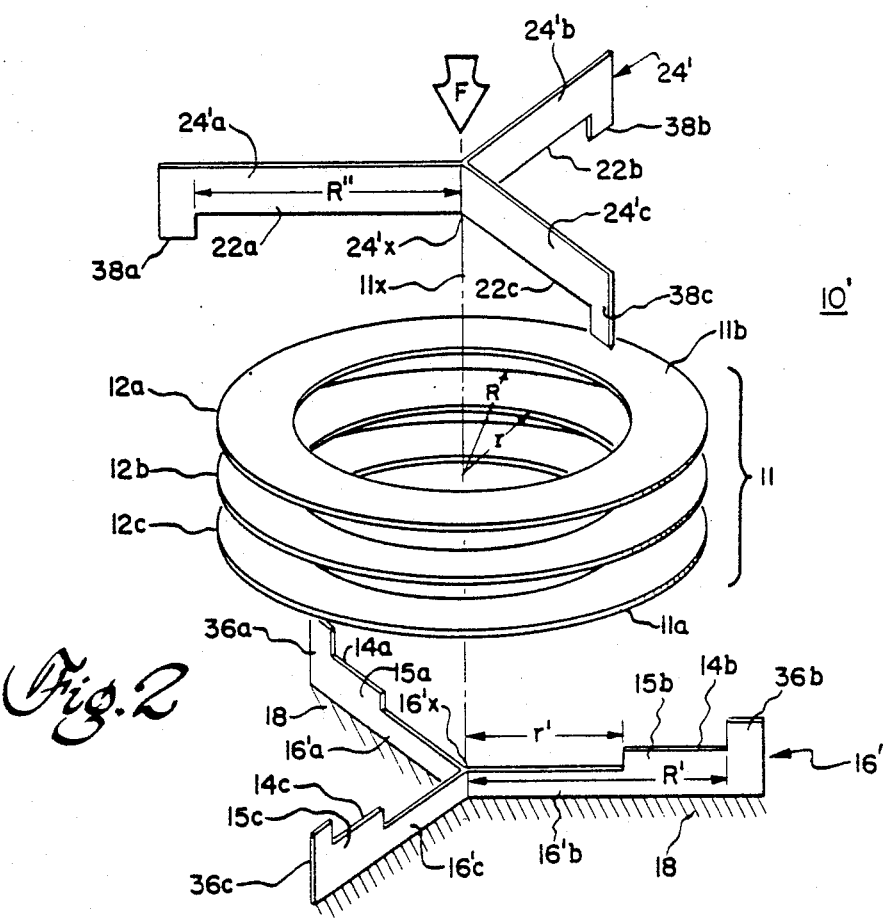
Fig. 2

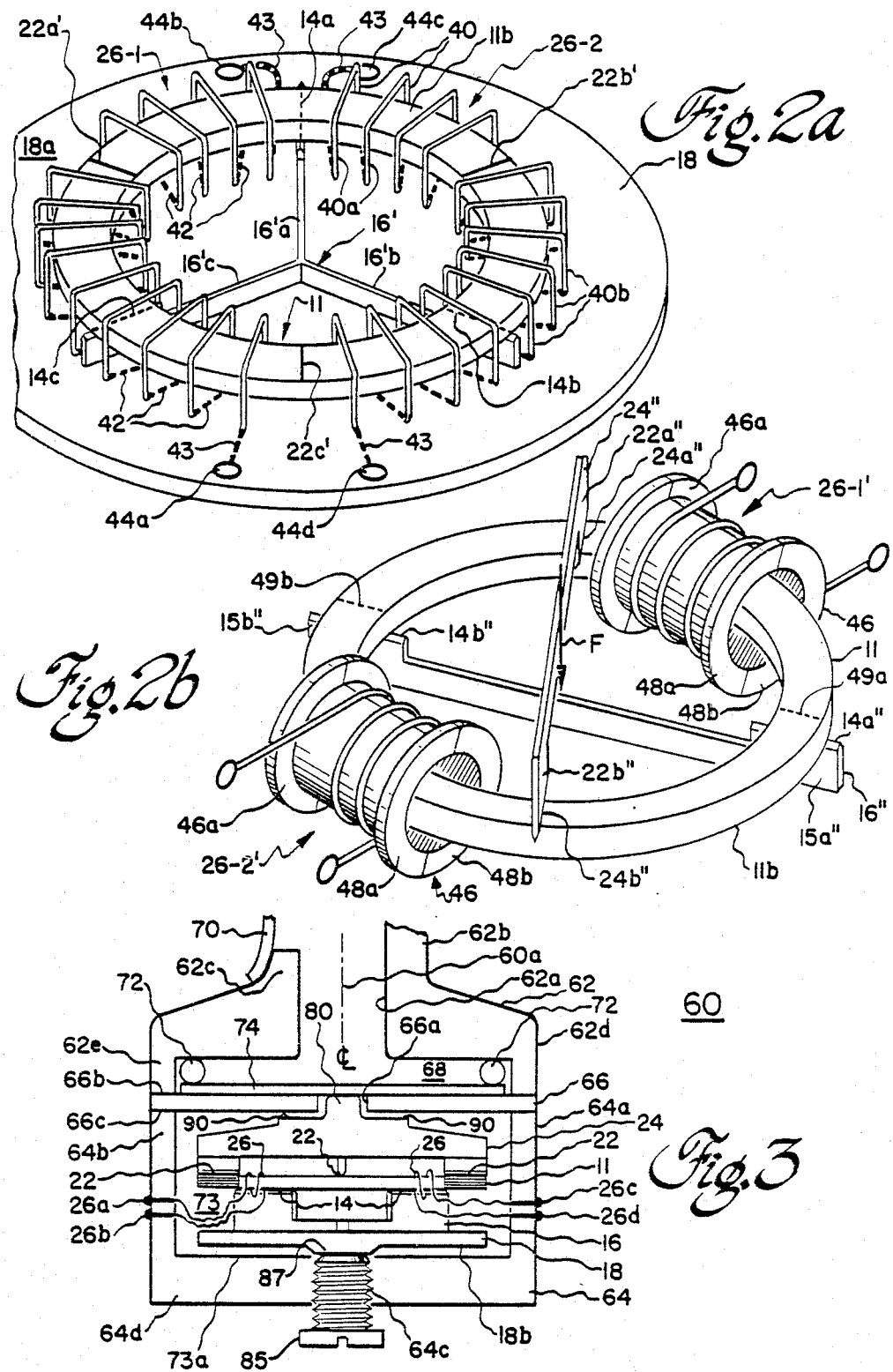

MAGNETOELASTIC FORCE/PRESSURE SENSOR

BACKGROUND OF THE INVENTION

The present invention relates to force/pressure sensors and, more particularly, to a novel force/pressure sensor utilizing a stack of annular rings of a magnetoelastic material, for sensing the magnitude of a force imparted to the sensor substantially along the ring stack axis.

It is known to measure the magnitude of a force by means of magnetoelastic sensing elements. Typically, the magnetoelastic force sensor requires at least one tape-wound toroidal ring of a magnetoelastic material, such as an amorphous metal alloy; such a sensor operates responsive to distortion of the tape-wound ring by a radially-acting force. In addition to the use of tape-wound toroidal cores of magnetoelastic material for force sensing, other force sensors utilize a flat amorphous metal ribbon which is placed under tension, and has the force to be measured applied to a surface of the tensioned ribbon. Both approaches are somewhat mechanically complex and, therefore, costly and the repeatability of each sensor in a group thereof appears to be dependent upon the metallurgical processes utilized to originally process the magnetoelastic material. It is therefore highly desirable to provide a magnetoelastic force/pressure sensor utilizing a relatively simple mechanical configuration, having low cost and relatively repeatable sensitivity to displacement, force, or pressure.

BRIEF SUMMARY OF THE INVENTION

In accordance with the invention, a magnetoelastic force/pressure sensor utilizes a stack of annular rings of a magnetoelastic material, such as a silicon steel or an amorphous metal alloy. Each of the major surfaces of the ring stack is in abutment with a plurality of edges of one of a pair of members. Each of the edges in abutment with each major surface is advantageously disposed with equal angular orientation with respect to all other edges in abutment with the same surface, and with complementary orientation to the edges, of the other member, in abutment with the opposite ring stack surface. At least one coil means is provided about the ring stack for measuring the change in the ring stack magnetic characteristics, responsive to the change in magnitude of a force along the ring axis and distorting the normally flat ring.

In presently preferred embodiments, the change in ring stack flux density saturation magnitude is measured for a change in axial force (pressure). The pair of members are upper and lower members, each including leg extensions having edges respectively in abutment with one or the other of the stack surfaces. One of the members is maintained substantially immovably with respect to the other member, which is responsive to the axial force/pressure to be measured. Embodiments utilizing a plurality, e.g. 2, 3, 4, . . . , of stack-abutting edges are described, as are several different embodiments for forming the measurement coil means about the ring stack. Use of the force sensor in a presently preferred embodiment of a pressure transducer is also illustrated.

Accordingly, it is an object of the present invention to provide a novel force/pressure sensor utilizing a stack of rings of magnetoelastic material and responsive to the magnitude of a force acting along the ring stack axis.

This and other objects of the present invention will become apparent upon reading of the detailed description of the present invention, when considered in conjunction with the associated drawings.

BRIEF DESCRIPTION OF THE DRAWINGS

FIG. 1 is a side view of a portion of a magnetoelastic force sensor, in accordance with the principles of the present invention, and illustrative of the principles of operation;

FIG. 1a is a graph illustrating the change in flux density B saturation amplitude with applied force in the sensor of FIG. 1;

FIG. 2 is an exploded perspective view of the mechanical portion of a first presently preferred embodiment of the sensor;

FIG. 2a is a perspective view of a portion of a sensor of the present invention and illustrating one presently preferred embodiment of electrical sensing coils, as used with the first embodiment of mechanical structure;

FIG. 2b is a perspective view of a portion of a sensor of the present invention and illustrating another presently preferred embodiment of electrical sensing coils, as used with a second embodiment of mechanical construction; and FIG. 3 is a sectional side view of a presently preferred magnetoelastic pressure sensor embodiment.

DETAILED DESCRIPTION OF THE INVENTION

Referring initially to FIGS. 1 and 1a, our novel magnetoelastic pressure/force sensor 10 utilizes a stack 11 of at least one annular ring 12 of a magnetoelastic material, such as silicon steel, amorphous metal alloys and the like. Preferably, a plurality of thin annular rings, e.g. the pair of annular rings 12a and 12b, are aligned in registration one atop the other to form stack 11. The rings 12 are supported upon one major stack surface 11a at a plurality of points 14 (of which only one point 14a is here illustrated). Each point 14 is located at an end of an associated leg projection 15 extending substantially perpendicular to the upper (or interior) surface 16a, closest to stack 11, of a first member 16. The opposite (or exterior) surface 16b of first member 16 is in abutment with a fixed, non-movable surface, or member, 18. Each of a plurality of points 20 is located at an end of an associated leg projection 22 extending substantially perpendicular from a lower (or interior) surface 24a, closest to stack 11, of a second member 24. Each point 20 abuts upon the opposite major surface 11b of the stack 11 of annular rings 12. Each of points 20 (e.g. point 20a) is separated from all other points 20 (e.g. point 20b) extending from the second member surface 24a; each of points 14 (e.g. point 14a) is separated from all other points 14 (not shown in FIG. 1) extending from first member surface 16a. There may be a pair of contact points 20 for each contact point 14 (e.g. one of points 20a and 20b on either side of a line extending through the leg projection on which point 14a is formed) or, as will be seen hereinbelow, there may be an equal number of points 14 and 20, disposed as discussed with respect to FIGS. 2, 2a. 2b and 3.

The force F to be sensed is applied substantially normal to an exterior (or upper) surface 24b of second member 24, and is thus applied not only in the general direction of extension of leg projections 15 and 22 but especially in a direction along the axis 11x of the stack 11 of annular rings 12. Coil means 26 is formed about a portion of the annular ring stack 11, to provide an electrical sensing means, having a pair of opposed ends 26a and 26b, for measurement of the magnetic characteristics of the stack 11 of annular rings 12, with respect to the magnitude of applied force F.

In the absence of the application of a force F (applied along stack axis 11x and against second member surface 24b, when first member surface 16b is held substantially immovable), each layer (i.e. each ring 12) of the stack 11 is subjected to a low level of mechanical stress and has a somewhat "rectangular" magnetic hysteresis loop 30 (FIG. 1a) having a first magnetic flux density saturation value $|B_M|$, as shown at positive and negative saturation limits 30a and 30b. As increasing magnitudes of force F are applied to movable member 24, leg projections 22 are moved downwardly and the pressure of points 20a and 20b (and the counterpressure of point 14a) causes the annular rings of stack 11 to press against one another and then buckle to assume a somewhat wavy shape in a plane orthogonal to axis 11x. The distortion of stacked rings 12 of magnetoelastic material causes the stack 11 to have a different hysteresis loop 32, wherein the saturation magnetic flux density magnitude $|B_M'|$ has positive and negative saturation limits 32a and 32b which decrease with respect to the saturation magnetic flux density magnitude $|B_M|$ of the loop with lesser, or no, applied force F. Thus, the saturation magnetic flux density magnitude decreases, in the direction of arrows C, with application of increasing axial force F along stack axis 11x. The decrease in saturation flux density magnitude is sensed, by use of sensing coil means 26, and external means (not shown) as an effect upon an A.C. waveform signal supplied from a source (also not shown) external to the sensor. Sensing may be accomplished by use of a single coil 26, utilizing a constant-voltage-drive/current-output-monitoring technique, or by the use of a pair of coils (as illustrated in FIGS. 2a, 2b and 3) using a voltage input/voltage output ratio technique, and may be provided by the source/sensing circuitry disclosed and claimed in co-pending U.S. application Ser. No. 546,228 filed on even date herewith, assigned to the assignee of the present invention and incorporated herein in its entirety by reference.

Thus, electrical signals having a characteristic thereof substantially proportional to the force axially applied to at least one magnetoelastic annular ring are provided by the force/pressure transducer of the present invention.

While a pair of leg projections 22 and associated points 20 on one structured member 24 may be utilized with each leg projection 15 and associated point 14 on the opposite structural member 16, we presently prefer to use an equal number of distortion-causing respective leg projections 15 and 22 and points 14 and 20, respectively, on each of the respective fixed and movable members 16 and 24. We have found that three leg projections and associated points upon each of the fixed and movable members provides a greater magnitude of output signal change, with respect to the use of only a pair of leg projections and points from each of fixed and movable members 16 and 24. In addition, the use of three extensions can provide an inherently symmetrical support system for the annular ring stack 11.

In the embodiment of FIG. 2, the magnetoelastic ring stack 11 comprises a plurality of magnetoelastic rings 12, e.g. three rings 12a–12c, aligned in registration with each other and with the resulting stack central axis 11x arranged vertically. Each ring 12 is formed of a selected magnetoelastic material, such as a silicon steel, an amorphous metal alloy and the like; each ring has an inner radius r (which may be, by way of illustration only, about ¼" and, more specifically, about 0.225") and has an outer radius R (which may be, by way of illustration only, about 7/16" and, more specifically, about 0.425").

Lower (or fixed) support member 16' comprises a three-legged member having one leg projection portion 15a, 15b or 15c, raised from, and in the plane of, each of legs 16'a, 16'b or 16'c, respectively, and perpendicular to immovable member 18. Each leg projection portion 15a–15c has dimensions such that the associated point portion 14a–14c begins at a minimum distance r' (less than the inner radius r of the rings 12) from the common leg joint 16'x (itself substantially aligned with the stack axis 11x) and extends to a maximum distance R' (greater than the outer radius R of the rings 12), to assure that the lower stack surface 11a bears against all point portions 14 even if the stack axis 11x and support member axis 16'x are slightly misaligned. The legs 16'a, 16'b and 16'c are provided with substantially equal angular disposition, i.e. with an angle of about 360°/N, where N is the number of legs (e.g. about 120° for N=3 legs), between each leg and the remaining two legs of the support. Each leg may also include an outer extension portion 36a, 36b or 36c, provided at a distance from the support member center 16'x equal to at least the exterior radius R of the annular rings 12, to aid in maintaining the individual rings 12a–12c in axially-aligned registration, when the stack 11 is placed upon the three lower point portions 14a–14c.

Upper (or movable) support member 24' also comprises a three-legged member having one leg projection portion 22a, 22b or 22c, in the plane of each of legs 24'a, 24'b or 24'c, respectively; each leg projection portion 22a–22c may be of the same height as the remainder of the member leg portion 24'a–24'c, for a distance R" from the common leg joint 24'x, which will be substantially aligned with the stack axis 11x; the distance R" is at least as great as the stack ring 12 outer radius R. It should be understood that leg portions 16'a–16'c of the lower support member 16' can also be of the same height as the leg projection portions 15a 15c thereof, similar to the uniform height leg/leg projection portions of upper member 24'. As with lower member 16', upper member 24' has the legs thereof provided with substantially equal angular disposition, i.e. with an angle of about 360°/N (e.g. about 120° for three legs), between each leg and the remaining two legs of the support. Each leg may also be provided with an outer extension portion 38a, 38b or 38c, commencing at a distance, from the upper support member center junction 24'x, equal to distance R"; the downwardly-directed extension portions 38 serve as a maximum-travel stop means, such that application of more than some maximum force F, against the "spring" action of the ring stack 11, can only move upper member 24' downwardly by that maximum distance necessary to cause the lower ends of extensions 38 to abut immovable base member 18 and thus prevent additional downward movement responsive to the applied force.

Sensor 10' is assembled by securing lower member 16' to immovable surface 18, placing the aligned stack 11 of the at least one annular disk members 12 upon lower member edges 14, with the stack axis 11x substantially aligned with the lower member axis joint 16'x, and then placing upper member 24 upon, and substantially in abutment with, the upper stack surface 11b. The upper and lower member leg portions 24'a–24'c and 16'a–16'c are so disposed as to provide substantially equal angular displacements between the legs of the opposite members, i.e. upper member leg 24'a is placed diametrically opposite to lower member leg 16'b, and bisecting the angle between lower member legs 16'a and 16'c, etc. By so offsetting each upper member 24' leg (with an offset angle of 360°/2N) to bisect the angle formed by the pair of adjacent lower member 16' legs, the distortion, responsive to force F, of the stack 11 rings is made substantially uniform and somewhat more reproduceable.

This offsetting arrangement is also shown in FIG. 2a, wherein lower, fixed member 16' is attached to a circular immovable support member 18, with the lower member edge projections 14a, 14b and 14c positioned to bear against the ring surface 11a, at locations referenced by broken lines; the upper member 24' (not shown in this Figure) will have its edge portions 22a–22c bearing upon upper stacked surface 11b at the solid line positions 22'a, 22b' and 22c', respectively.

FIG. 2a illustrates one presently preferred embodiment for forming the sensing coil means 26. In applications where coil 26 requires a relatively few number of turns, three-quarters of each turn is formed of a radially-disposed conductive staple 40a having the opposite ends, e.g. interior end 40a and exterior end 40b, thrust into the material of immovable support 18. Support 18 is fabricated of an insulative material and has a plurality of conductive, i.e. printed circuit, leads 42 fabricated upon one of the upper surface 18a or the lower surface thereof. Leads 42 are so disposed as to connect the interior end 40a of a first staple 40 to the outer end 40b of a next adjacent staple 40. In this manner, completion of the fourth side of each turn is accomplished. Additional conductive leads 43 are also fabricated upon member surface 18a, leading radially outwardly from the circle formed by staple exterior legs 40b, to interconnect each of a plurality of termination pads 44 to the appropriate leg of each staple forming the initial and final turns of each of at least one coil. In FIG. 2a, a pair of coils 26-1 and 26-2 are formed, respectively between termination pads 44a–44b and 44c–44d. The pair of coils may be utilized for a voltage-input/voltage-output ratio measurement of magnetic flux density saturation magnitude, or may have a jumper wire connected, as between terminals 44a and 44c to provide a single coil (wherein the pair of coil terminals 26a and 26b of FIG. 1 are formed by terminal pads 44b and 44d respectively) if only a single coil for a constant-voltage-drive/current-output-monitoring measurement technique of magnetic flux density magnitude is to be utilized.

Referring now to FIG. 2b, for a sensor having at least one sensing coil, with large or small required turns, each coil 26-1', 26-2', etc. may be wound upon an insulated bobbin 46, which may itself be formed of a pair of complementary semi-cylindrical members 48a and 48b. It will be seen that the pair of half-bobbin members 48 are placed about the annular ring stack 11 and suitably fastened together, and coils 26 then wound within the bobbin channel 46a.

FIG. 2b also illustrates the use of upper and lower members 16'' and 24'' each having only a pair of extension portions 15a'' and 15b'' or 22a'' or 22b''. Thus, the annular ring stack 11 is supported by lower member edges 14a'' or 14b'' at a pair points, illustrated by the broken line edge indicators 49a and 49b (shown extended to the upper stack surface from the actual lines on the lower surface), while the edge portions 24a'' and 24b'' of upper member 24' contact the annular ring stack upper surface 11a at a pair of diametrically opposed points, which are disposed along a line substantially perpendicular to the line running through lower edge points 49a and 49b. Thus, it should be understood that each of the opposite major surfaces 11a and 11b of the annular ring stack 11 have at least a plurality of edge portions in abutment therewith, with substantially equal annular displacement between the totality of sequential (and alternating) edge portions.

Referring now to FIG. 3, a presently preferred embodiment of a pressure sensor 60 is illustrated utilizing a force-sensing magnetoelastic ring stack 11. Sensor 60 includes an outer shell top member 62, an outer shell bottom member 64 and a separating annular washer 66. Shell members 62 and 64 can be fabricated of any material impervious to the "fluid" whose pressure is to be measured; many of the common plastics are acceptable. Top shell member 62 has a volume 68 formed, as a right circular cylinder, into the bottom surface thereof, in communication with a channel 62a. The upper portion of top shell member 62 may be extended as a tube wall 62b, surrounding channel 62a, for introduction of the fluid, at the pressure to be measured, into volume 68. Alternatively, the top shell member upper portion 62c may be suitably contoured for attachment of a separate tube 70, for conveyance of the pressurized fluid to channel 62a and thence to volume 68. Advantageously, the volume 68 is cylindrical about sensor center-line axis 60a, as are the outer walls 62d of the lower portion of top shell member 62, to form an annular wall portion 62e bounding chamber 68.

Lower shell member 64 can be formed of the same material as upper shell member 62, with a volume 73 formed into the upper surface thereof. Advantageously, volume 73 is also in the shape of a right circular cylinder, about sensor center line 60a, and has a circular outer periphery 64a. By utilizing the same diameter for top and bottom shell member outer peripheries 62d and 64a, and by making the interior volumes 68 and 73 of the same diameter (providing the downwardly-extending annular wall 62e of top shell member 62 and the upwardly-extending annular wall 64b of lower member 64 with the same thickness), the intermediate washer 66 can have an exterior diameter equal to the exterior diameter of both upper and lower shell members. Washer 66 includes an aperture 66a located substantially at the center of the washer and along the sensor center line 60a. The ends of the upper and lower annular wall portions 62e and 64b are sealed to the respective upper and lower washer surfaces 66b and 66c, respectively, about the entire periphery of the washer and both members.

Prior to sealing, an O-ring 72, of outer diameter slightly greater than the interior diameter of volume 68, is inserted into volume 68 and is then overlaid with a slack diaphram member 74, typically of circular shape and of diameter at least equal to the inner diameter of wall portion 62e. Diaphram member 74 may be formed of any suitable flexible material, such as Kapton ® the like. The thickness of O-ring 72 is such that upon insertion of 0-ring 72 and diaphram 74 and sealing of washer 66 to the ends of upper member annular wall 62e, in pressure-tight manner, along the outer periphery of the washer upper surface 66b, the O-ring is compressed to form a pressure-tight seal of the periphery of the diaphram member 74 to the washer upper surface 66b.

The fixed member 18, having a circular periphery of diameter less than the interior diameter of the lower shell member volume 73, is placed at the bottom of volume 73 and first member 16 is positioned thereon. Advantageously, lower member 16 will be fastened to member 18, by suitable adhesive or the like material, to maintain the center axis of member 16 in alignment along the center line 60a of the sensor. The annular magnetoelastic ring stack 11 is then positioned upon the appropriate edge portions 14 of member 16; the at least one coil means 26, fabricated about a portion of the ring stack periphery, is then, if not previously, positioned as required to provide clearance for the edges of upper member 24, to be brought into abutment with the upper surface of stack 11. The upper member 24 is then positioned with the appropriate distortion-causing edges 22 resting at the appropriate locations upon the top surface of stack 11. In the sectional view of FIG. 3, each of upper and lower members 24 and 16, respectively, are provided with four edge-bearing extensions, each disposed at a 90° angle with respect to the adjacent edge-bearing extensions of the same member, and each member extension disposed at a 45° angle with respect to the adjacent extensions of the other member.

Upper member 24 is provided with an integral extension portion 80, extending upwardly along the sensor center line 60a. Extension portion 80 is of a diameter less than the diameter of the washer aperture 66a, and of a length such that extension 80 passes through washer aperture 66a and is in abutment with the adjacent surface of diaphram member 74, when the upper shell member 62/washer 66 subassembly is placed over the lower member subassembly and the washer lower surface 66c periphery is sealed, in pressure-tight fashion, to the end of the lower shell member annular wall portion 64b. It should be understood that the upper member, washer and lower member assembly can be fastened together by other means, such as by rolled collar, clamp and the like means.

It will be seen that an increase in the pressure introduced into the chamber formed by upper member volume 68 will exert a force pressing down upon that portion of diaphram 74 over washer aperture 66a and cause extension 80 to be pushed downwardly. The downward movement of extension 80 moves first member 24 downwardly, distorting the annular ring stack 11 and reducing the saturation magnetic flux density magnitude. This change in saturation flux density magnitude is sensed through the use of one or both coils 26 (which themselves are brought through the bottom shell member wall, in pressure-tight fashion, if required, to the coil ends 26a–26d, as required, available upon the sensor external surface). Similarly, a reduction in pressure of the fluid is communicated to the chamber formed by volume 68 and causes a relaxation of force upon, or an upward motion of, the portion of diaphram means 74 over washer aperture 66a. The "springiness" of the annular rings of stack 11 is transmitted through first member edges 22 to the first member 24, and its extension 80, causing the first member to move upwardly to keep extension 80 in contact with diaphram means 74. Thus, a pressure reduction reduces the distortion of the annular rings of stack 11 and results in an increase in the absolute magnitude of the saturation flux density of the ring stack, which change in saturation flux density is related to the change in pressure, and is sensed, again, by use of one or both coil means 26.

As each of the annular rings 12 in stack 11 is relatively thin, it is difficult to ensure that each ring will be substantially flat, such that, if the bottom surface 18b of member 18 is in abutment with the bottom surface 73a of the chamber formed by volume 73, extension 80 will abut against the diaphram means surface in suitable manner. Accordingly, a threaded aperture 64c is fabricated through the bottom wall 64d of the lower sensor housing member 64, along the sensor center line 60a, to receive an adjustment means 85, such as a screw and the like. The bottom surface 18b of member 18 may also be provided with a short extension formation 87, against which the adjustment means 85 will bear, to allow movement of member 18 upwardly and downwardly responsive to rotation of screw 85, to adjust the contact force of extension 80 against diaphram 74. Equally advantageously, upper member 24 may be provided with formations 90, about the periphery of the base of extension 80, and of a diameter such that formations 90 can be brought to bear against the lower surface washer 66c and prevent excessive upward adjustment of first member 24. By introducing a reference pressure into the chamber formed by upper volume 68, adjustment screw 85 can be utilized to compress the rings of stack 11 by an amount sufficient to provide a calibration reference signal by monitoring the output of the appropriate one of coil means 26, with formations 90 preventing overadjustment and possible damage of the completed sensor during calibration. Formations 90 can be utilized with means 85 to remove some of the "springiness" of the disc stack by precompression of the stack at initial calibration. The formations can also be used to set a minimum sensed pressure, below which pressure diaphram 74 will be forced upward to a degree such that extension 80 will not be able to follow due to formations 90 coming into abutment with the lower washer surface 66.

While several presently preferred embodiments of our novel magnetoelastic pressure/force sensor have been described in detail herein, many modifications and variations will now become apparent to those skilled in the art. For example, if the spring constant of the rings (in the stack) is relatively low, the sensor can be utilized for displacement sensing. Other geometric shapes, such as annular triangles, squares, rectangles and polygons can be equally as well utilized. Similarly, lower member chamber 73 can be vented to ambient atmosphere for a gauge (rather than absolute) pressure sensor. It is our intent, therefore, to be limited only by the scope of the appending claims and not by the specific details and instrumentalities presented by of explanation of these preferred embodiments herein.

What is claimed is:
1. A force/pressure sensor, comprising:
a plurality of solid annular rings formed of a magnetoelastic material, said plurality of rings being arranged one stop another in a stack having opposed first and second major surfaces and an axis substantially perpendicular to said major surfaces:
a first member having a plurality of edges extended therefrom to abut against the first stack major surface at a like plurality of different locations thereon;
a second mamber having another plurality of edges extended therefrom to about against the second stack major surface at a like plurality of locations different from each other and also from the locations at which the first member edges abut said first stack major surface, said second member moving along said axis toward and distorting said ring stack in the direction of and responsive to an impingent force along said axis and to be measured; and at least one coil means formed about a portion of the annular ring stack and adapted for measurement of a change in magnitude of the maximum magnetic flux density of the ring stack responsive to a change in magnitude of the axial force acting thereon.

2. The sensor of claim 1, wherein the number of the plurality of first member edges is twice the number of the plurality of second member edges.

3. The sensor of claim 1, wherein the number of the plurality of first member edges is equal to the number of the plurality of second member edges.

4. The sensor of claim 3, wherein each edge is positioned substantially at an angle of (360/N) degrees with respect to adjacent edges extended from the same member, wherein N equals the number of the plurality of edges extended from that member.

5. The sensor of claim 4, wherein N is between 2 and 4.

6. The sensor of claim 5, wherein N=3.

7. The sensor of claim 4, wherein edges extended from opposite ones of said first and second members are positioned at an angle of about (360/2N) degrees between adjacent edges extended from alternating members.

8. The sensor of claim 7, wherein the number of edges extending from each member is between 2 and 4.

9. The sensor of claim 8, wherein three edges extend from each of said first and second members.

10. The sensor of claim 1, wherein said first member includes means for maintaining the rings in said stack substantially in alignment.

11. The sensor of claim 1, further comprising a base member supporting said first member at an alignment positioned, with respect to said stack axis, which does not substantially change with changes in said axially-applied force.

12. The sensor of claim 11, further including means for preventing application to said stack of a force greater than a preselected magnitude.

13. The sensor of claim 12, wherein said preventing means includes portions of said second member adapted to abut said base member and prevent excessive stack distortion if said preselected force magnitude is applied to said sensor.

14. The sensor of claim 1, further comprising a housing enclosing at least said stack, said coil means and said first and second members.

15. The sensor of claim 14, further comprising means for preventing application to said stack of a force of magnitude less than a preselected magnitude.

16. The sensor of claim 15, wherein said preventing means comprises at least one formation positioned on said second member for engaging a portion of said housing when the axial force magnitude decreases to said preselected minimum magnitude and moves said first member away from said second member by a predetermined amount.

17. The sensor of claim 16, wherein said sensor is adapted to measure a pressure, and further comprising: a chamber receiving said pressure; a diaphragm forming at least one wall of said chamber; said housing having an aperture formed therethrough adjacent to said diaphragm; and said second member has an extension portion extending through said aperture and into abutment with said diaphragm and moving said second member along said stack axis responsive to movement of said diaphragm caused by changes in pressure in said chamber.

18. The sensor of claim 1, wherein said magnetoelastic material is one of a silicon steel and an amorphous metal alloy.

19. The sensor of claim 1, further including a base member of an insulative material, and having a surface upon which said first member rests; said coil means comprising a multiplicity of conductive U-shaped staples, each extending over said stack and having two separated ends fastened into said base member; and a plurality of conductive lead means fabricated on said base member surface and each positioned for connecting an interior end of one staple to an exterior end of a next staple.

20. The sensor of claim 19, further comprising a plurality of electrical terminals and conductive lead means for interconnecting each of said electrical terminals to a different selected end of a selected one of said staples.

21. The sensor of claim 1, wherein each of said at least one coil means comprises: an insulative bobbin formed about said ring stack, each bobbin having a channel formed about the exterior periphery thereof; and a coil of conductive wire wound within the channel of each bobbin.

22. The sensor of claim 1, wherein said at least one coil means comprises a pair of coils each wound about said stack.

23. The sensor of claim 1, wherein each ring has a selected interior radius r and a selected exterior radius R, and a thickness much less than either interior or exterior radii.

24. The sensor of claim 23, wherein the interior radius r is about one-quarter inch and the exterior ring radius R is about seven-sixteenth inch.

25. The sensor of claim 24, wherein the interior radius r is about 0.225 inches and the exterior ring radius is about 0.425 inches.

* * * * *